United States Patent
Matsushita

(10) Patent No.: US 10,195,582 B2
(45) Date of Patent: Feb. 5, 2019

(54) GASIFICATION FURNACE, GASIFICATION SYSTEM, REFORMER AND REFORMING SYSTEM

(71) Applicants: ZE Energy Inc., Tokyo (JP); Yasuharu Matsushita, Toyama (JP); Kohei Matsushita, Tokyo (JP)

(72) Inventor: Yasuharu Matsushita, Toyama (JP)

(73) Assignees: ZE Energy Inc., Tokyo (JP); Yashuharu Matsushita, Tokyo (JP); Kohei Matsushita, Tokyo (JP)

(*) Notice: Subject to any disclaimer, the term of this patent is extended or adjusted under 35 U.S.C. 154(b) by 73 days.

(21) Appl. No.: 15/069,232

(22) Filed: Mar. 14, 2016

(65) Prior Publication Data
US 2016/0193584 A1 Jul. 7, 2016

Related U.S. Application Data

(62) Division of application No. 13/884,108, filed as application No. PCT/JP2011/075583 on Nov. 7, 2011, now Pat. No. 9,315,746.

(30) Foreign Application Priority Data

Nov. 8, 2010 (JP) .................. 2010-249639
Nov. 8, 2010 (JP) .................. 2010-249640

(51) Int. Cl.
*B01J 19/24* (2006.01)
*C01B 3/32* (2006.01)
(Continued)

(52) U.S. Cl.
CPC ............... *B01J 19/24* (2013.01); *C01B 3/32* (2013.01); *C01B 3/36* (2013.01); *C10J 3/26* (2013.01);
(Continued)

(58) Field of Classification Search
CPC ........ C10J 2300/0956; C10J 2300/0959; C10J 3/74; C10J 2200/09; C10J 2300/1253; C10J 2300/1861; C01B 3/36; C01B 2203/0883
See application file for complete search history.

(56) References Cited

U.S. PATENT DOCUMENTS 2,655,442 A 10/1953 Mayland
3,971,847 A 7/1976 Houseman
(Continued)

FOREIGN PATENT DOCUMENTS

CN 1382202 A 11/2002
CN 1926222 A 3/2007
(Continued)

OTHER PUBLICATIONS

Notice of Reason for Rejection for Japanese Patent Application No. 2010-249640 dated May 24, 2016, with partial English translation, 12 pages.
(Continued)

*Primary Examiner* — Imran Akram
(74) *Attorney, Agent, or Firm* — Alston & Bird LLP

(57) ABSTRACT

A gasification furnace for gasifying a biomass resource in a manner producing a low quantity of tar. The gasification furnace (10) is provided with a punching plate (11) partitioning the furnace interior into upper and lower spaces; a biomass resource supply port (10a) for supplying the biomass resource over the punching plate (11); a first oxidizer supply port (10c) and a second oxidizer supply port (10d) for supplying an oxidizer into the furnace; a first oxidizer supply path supplying the oxidizer from the first oxidizer supply port (10c) from above towards below the punching plate (11); a second oxidizer supply path distributing and supplying to a plurality of locations within a predetermined area in the vicinity of the punching plate (11) from the second
(Continued)

oxidizer supply port (10d); and a dry distillation gas output (10b) for discharging dry distillation gas generated by the pyrolysis and partial oxidation of the biomass resource on the punching plate (11) to the outside.

3 Claims, 7 Drawing Sheets

(51) Int. Cl.

| | | |
|---|---|---|
| C10J 3/82 | (2006.01) | |
| C10J 3/26 | (2006.01) | |
| C10J 3/72 | (2006.01) | |
| C10J 3/80 | (2006.01) | |
| C10K 3/00 | (2006.01) | |
| F23G 5/027 | (2006.01) | |
| F23G 5/46 | (2006.01) | |
| F23G 7/10 | (2006.01) | |
| C01B 3/36 | (2006.01) | |
| F28D 20/00 | (2006.01) | |
| F28D 1/053 | (2006.01) | |
| F28D 21/00 | (2006.01) | |

(52) U.S. Cl.
CPC ............ *C10J 3/723* (2013.01); *C10J 3/80* (2013.01); *C10J 3/82* (2013.01); *C10K 3/005* (2013.01); *F23G 5/0276* (2013.01); *F23G 5/46* (2013.01); *F23G 7/10* (2013.01); *F28D 1/05316* (2013.01); *F28D 20/0056* (2013.01); *B01J 2219/00103* (2013.01); *B01J 2219/24* (2013.01); *C01B 2203/025* (2013.01); *C01B 2203/0255* (2013.01); *C01B 2203/06* (2013.01); *C01B 2203/0833* (2013.01); *C01B 2203/0894* (2013.01); *C10J 2200/09* (2013.01); *C10J 2300/0916* (2013.01); *C10J 2300/1671* (2013.01); *C10J 2300/1693* (2013.01); *C10J 2300/1869* (2013.01); *C10J 2300/1884* (2013.01); *C10J 2300/1892* (2013.01); *F23G 2201/40* (2013.01); *F23G 2206/203* (2013.01); *F28D 2021/0075* (2013.01); *Y02E 20/12* (2013.01); *Y02E 60/142* (2013.01)

(56) References Cited

U.S. PATENT DOCUMENTS

| | | | |
|---|---|---|---|
| 4,057,402 A | 11/1977 | Patel et al. | |
| 4,098,586 A | 7/1978 | Woodmansee | |
| 4,282,009 A * | 8/1981 | Belke | B01J 8/10 110/229 |
| 4,306,506 A | 12/1981 | Rotter | |
| 4,309,195 A | 1/1982 | Rotter | |
| 4,336,769 A | 6/1982 | Daman | |
| 4,764,185 A | 8/1988 | Mayer | |
| 4,865,540 A * | 9/1989 | Fitzgerald | B01J 8/1809 431/89 |
| 5,230,716 A | 7/1993 | Notestein | |
| 6,837,910 B1 | 1/2005 | Yoshikawa et al. | |
| 2002/0034458 A1* | 3/2002 | Roy | B01J 8/0055 422/139 |
| 2004/0060236 A1 | 4/2004 | Yoshikawa et al. | |
| 2004/0159046 A1* | 8/2004 | Komaki | B01J 8/0438 48/127.9 |
| 2004/0178765 A1 | 9/2004 | O'Brien et al. | |
| 2007/0175095 A1 | 8/2007 | Ito et al. | |
| 2008/0134577 A1* | 6/2008 | DeVries | C01B 3/384 48/61 |
| 2008/0148634 A1 | 6/2008 | Yu et al. | |
| 2010/0269410 A1 | 10/2010 | Nakamura et al. | |
| 2010/0299995 A1 | 12/2010 | Sakai et al. | |

FOREIGN PATENT DOCUMENTS

| | | |
|---|---|---|
| CN | 101498291 A | 8/2009 |
| CN | 101529193 A | 9/2009 |
| DE | 20 2006 009174 U1 | 10/2007 |
| EP | 0 736 485 A1 | 10/1996 |
| EP | 1 983 262 A2 | 10/2008 |
| EP | 2 012 059 A1 | 1/2009 |
| JP | 2002-210444 A | 7/2002 |
| JP | 2004-035837 A | 2/2004 |
| JP | 2006-231301 A | 9/2006 |
| JP | 2006-299011 A | 11/2006 |
| JP | 2007-238701 A | 9/2007 |
| JP | 2008-081637 A | 4/2008 |
| JP | 2008-169320 A | 7/2008 |
| JP | 2009-280633 A | 12/2009 |
| WO | WO 2008/050727 A1 | 5/2008 |

OTHER PUBLICATIONS

First Chinese Office Action from Chinese Patent Application No. 201410768320.1 dated Jul. 5, 2016, with English translation, 11 pages.
International Search Report and Written Opinion for Application No. PCT/JP2011/075583 dated Jan. 24, 2012.
Notice of Reason for Rejection from Japanese Patent Office for Japanese Patent Application No. 2010-249640 dated Nov. 18, 2014.
Partial European Search Report from corresponding European Patent Application No. 11839444.4 dated Jul. 8, 2015.
Supplementary European Search Report for Application No. EP 11 83 9444 Dec. 9, 2015.
Extended European Search Report for European Patent Application No. 17168896.3 dated Oct. 19, 2017, 9 pages.

* cited by examiner

GASIFICATION FURNACE, GASIFICATION SYSTEM, REFORMER AND REFORMING SYSTEM

CROSS-REFERENCE TO RELATED APPLICATIONS

This application is a divisional application of U.S. patent application Ser. No. 13/884,108, which is a national stage application filed under 35 U.S.C. § 371 of International Application No. PCT/JP2011/075583, filed Nov. 7, 2011, which claims priority from Japanese Patent Application No. 2010-249640, filed Nov. 8, 2010, and Japanese Patent Application No. 2010-249639, filed Nov. 8, 2010, the entire disclosure of each of which is hereby incorporated by reference in its entirety.

TECHNICAL FIELD

This invention relates to a gasification furnace and a gasification system for gasifying biomass resources, and a reformer and a reforming system for reforming dry distillation gas generated from biomass resources.

BACKGROUND ART

As is generally known, in recent years it has become a more popular practice to gasify biomass resources (biological resources such as construction debris and fragments) and use it as fuels. And gasification of biomass is usually done by downdraft type gasification furnace (see, for example, patent literature 1), or updraft type gasification furnace (see, for example, patent literature 2), however, both types of gasification furnaces produce relatively large amount of tar and clinker during gasification of biomass resources. The existing gasification furnaces are ones hard to control its furnace temperature (ones wherein thermal runaway sometimes occur).

Moreover, gasification of biomass resources is usually done by reforming dry distillation gas generated by the gasification furnace in a reformer (a reforming furnace, a reforming machine). However, the existing reformers (see, for example, patent literature 2 and 3) are ones that require electrical energy or fuel in order to operate.

SUMMARY OF INVENTION

Technical Problem

Under such circumstances, it is a primary object of the present invention to provide a gasification furnace and a gasification system capable of reforming biomass resources in a way that produces little amount of tar and/or clinker.

Further, it is a secondary object of the present invention to provide a gasification system that does not require electrical energy etc. to reform dry distillation gas.

Moreover, it is a tertiary object of the present invention to provide a reformer and a reforming system that do not require electrical energy etc. to reform dry distillation gas.

Solution to Problem

To accomplish the above primary object, a gasification furnace for gasifying biomass resources according to the present invention, includes: a punching plate dividing inside of the gasification furnace into upper and lower spaces; a biomass resource supply port supplying biomass resources on the punching plate; a first oxidizer supply port and a second oxidizer supply port each supplying oxidizer into the gasification furnace; a first oxidizer supply path supplying oxidizer, which is supplied from the first oxidizer supply port, from upper region of the punching plate downward; a second oxidizer supply path distributing oxidizer supplied from the second oxidizer supply port to a plurality of places within a predetermined area near the punching plate; and a dry distillation gas outlet discharging dry distillation gas generated by partial oxidation and pyrolysis of biomass resources on the punching plate.

Namely, the gasification furnace of the present invention has such a configuration capable of supplying oxidizer onto the biomass resource (woody/herbaceous biomass fragments) while supplying oxidizer to the bottom layer of the biomass that is piled up on the punching plate. Although details (specific reason/cause of less production of tar and clinker) are not yet clear, it is understood from every type of experiment that operating gasification furnace of the above configuration while supplying heated oxidizer (air only, or air and water vapor) to the bottom layer of biomass resources piled on top of punching plate, and supplying unheated oxidizer (air for example) to the biomass resources from the top, produces less tar and clinker. Therefore, it can be said that the gasification furnace of this invention can gasify biomass resources with minimal production of tar and clinker.

It is also understood that if the oxidizer amount which is supplied from the top is channeled, temperature inside furnace can be lowered rapidly. It can be said that the gasification furnace in this invention can easily control temperature inside the furnace.

For the gasification furnace in this invention, as long as oxidizer which is supplied from the second oxidizer supply port can be distributed to a plurality of places in predetermined area near punching plate, various different configuration/structure can be adopted as the second oxidizer supply path. For example, it is possible to adopt, as the second oxidizer supply path, a path distributing oxidizer supplied from the second oxidizer supply port to a plurality of places in predetermined area above the punching plate and a plurality of places in predetermined area below the punching plate. Further, it is also possible to adopt, as the second oxidizer supply path, a path including a plurality of pipes each of which has a plurality of through holes on its side surface, and passes through the punching plate.

The first oxidizer supply path of gasification furnace in this invention can be the through holes which is formed in the gasification furnace (furnace shell of the gasification furnace), or solid pipes. Furthermore, the punching plate for the gasification furnace in this invention do not need to be the punching plate of narrow sense, and items which can hold biomass resources in a form which allows gas to pass through (item where biomass resources do not fall off of; for example, mesh-like components) are acceptable.

The punching plate for the gasification furnace in this invention can also be a tabular member. However, various experiments proved that when the thickness of the biomass resources on the punching plate is uneven (part of biomass resources on the punching plate is thicker than others), it is less likely to misfire. Therefore, for the punching plate, it is desirable to use a non-tabular member, for example, a member in a shape like side faces of a pyramid corresponding to the shape of the horizontal cross-section of the gasification furnace.

Also, to accomplish the above primary object, the gasification system of the first aspect of the present invention includes: the gasification furnace according to any one of claims 1 through 6; a heat exchanger to generate heated air and water vapor using heat of dry distillation gas discharged from the dry distillation gas outlet of the gasification furnace; and an oxidizer supply path to supply the heated air and water vapor generated by the heat exchanger as oxidizer to the second oxidizer supply port.

In other words, the gasification furnace of the present invention is used in the gasification system of the first aspect of the present invention. Therefore, this is a gasification system which can gasify biomass resources with little production of tar and clinker. Also the gasification system of the first aspect of the invention has the configuration where oxidizer which is supplied to the gasification furnace is heated by the heat of dry distillation gas discharged from gasification furnace. Therefore, the gasification system of the first aspect of this invention does not require electrical energy to heat oxidizer.

For the heat exchanger in the gasification system of the first aspect of this invention, various different configurations can be adopted. For example, as the heat exchanger, it is possible to adopt a unit formed by connecting a plurality of unit heat exchangers each having an inlet and an outlet of heating object and an inlet and an outlet of heat source gas so that the dry distillation gas discharged from the gas release outlet of the gasification furnace passes through the unit heat exchangers one after another, and by connecting inlets of some of the plurality of the unit heat exchangers to outlets of rest of the plurality of the unit heat exchangers so that the some of unit heat exchangers function as means for generating heated air and the rest of the unit heat exchangers function as means for generating water vapor. By adopting such heat exchanger (by providing unit heat exchangers for such heat exchanger), the gasification systems of various specifications with different oxidizer (air, water vapor) amount and temperatures requirement can be made cheaply.

Moreover, adding a reformer which reforms dry distillation gas discharged from the gas exhaust outlet and supplies it to the heat exchanger to the gasification furnace, leads to the system which produces less tar and clinker during gasification of biomass resources.

Further, the gasification system of the second aspect of the invention includes: the gasification furnace according to claims 1 through 6; and a reformer to reform dry distillation gas discharged from the dry distillation gas outlet of the gasification furnace using heated air generated by the heat of the dry distillation gas.

That is to say, in the gasification system of the second aspect of this invention, the gasification furnace of the preset invention and the reformer which reforms dry distillation gas discharged from the gasification furnace using heated air generated by the heat of the dry distillation gas. Therefore, this gasification system can gasify biomass resources with little production of tar and clinker, and at the same time does not require electrical energy for reforming gas.

Note that, as the reformer in the gasification system of the second aspect, it is possible to adopt a unit including: a reformer vessel of hollow construction and having a dry distillation gas inlet to which dry distillation gas discharged from the gas outlet of the gasification furnace is input and dry distillation gas outlet from which the reformed dry distillation gas is discharged; a plurality of heat receiving pipes attached to the reformer vessel so that their upper parts make a plane nearly level to a mounting surface of the reformer and they pass through the reformer vessel; an air inlet connected with one end of each of the heat receiving pipes; a punching plate for holding heat storage material which is installed on parts of the plurality of the heat receiving pipes, the parts being in the reformer vessel; heat storage material placed on top of the punching plate for holding heat storage material; a plurality of hot air exhaust pipes each having portion that is kept in a space of the reformer vessel over the punching plate for holding heat storage material, the portion having a plurality of through holes in its pipe wall; and a connecting part connecting the plurality of the hot air exhaust pipes and the plurality of the heat receiving pipes so to allow air which pass through the plurality of the heat receiving pipes is discharged from each through hole of each hot air exhaust pipe.

To accomplish the above tertiary object, a reformer for reforming dry distillation gas of the present invention, includes: a reformer vessel; a dry gas inlet for introducing dry distillation gas into the reformer vessel, a reformed gas outlet for discharging reformed gas defined as the dry distillation gas after being reformed, an oxidizer inlet for introducing oxidizer into the reformer vessel, each of which are provided on the reformer vessel; a heat exchanger to heat oxidizer introduced through the oxidizer inlet by transferring heat of the dry distillation gas from the oxidizer inlet while the dry distillation gas introduced from the dry distillation gas inlet and oxidizer introduced through the reformer oxidizer inlet do not come in contact with each other; and an oxidizer discharge part for discharging oxidizer heated by the heat exchanger into the reformer vessel.

In other words, the reformer of the present invention has such a configuration that it generates high temperature oxidizer (such as heated air) which is necessary for reforming dry distilled gas (to burn part of dry distilled gas) by using heat of dry distilled gas which is to be reformed. The reformed gas/dry distillation gas by nature requires cooling. Therefore, this reformer does not require electrical energy for reforming dry distillation gas, and will be able to reform dry distillation gas by utilizing the heat of reformed gas/dry distillation gas.

The reformer of this invention can be made in different configurations with varying details. For example, the reformer of the invention can be made as a device with a common heat exchanger configuration (the device that, however, discharges heated matter into the heat exchanger itself instead of discharging it to the outside of the heat exchanger).

Further, the reformer of the present invention can be actualized as a device that includes the heat exchanger having: a plurality of heat receiving pipes attached to the reformer vessel so that their upper parts make a plane nearly level to a mounting surface of the reformer and they pass through the reformer vessel; a punching plate for holding heat storage material which is installed on parts of the plurality of the heat receiving pipes, the parts being in the reformer vessel; and heat storage material placed on the punching plate for holding heat storage material, and the oxidizer discharge part having: a plurality of hot air exhaust pipes each having portion that is kept in a space of the reformer vessel over the punching plate for holding heat storage material, the portion having a plurality of through holes in its pipe wall; and a connecting part connecting the plurality of the hot air exhaust pipes and the plurality of the heat receiving pipes so to allow air which pass through the plurality of the heat receiving pipes is discharged from each through hole of each hot air exhaust pipe.

It should be noted that, the reformer of the present invention can also be actualized as a device that us used to feed normal temperature oxidant through oxidizer inlet. However, when the reformer of this invention is actualized in such way, dry distillation gas/reformed gas normally travels less freely inside (when pressure loss on dry distillation gas/reformed gas is relatively large; when connected to gasification furnace, dry distillation gas is not released easily from gasification furnace).

On the other hand, dry distillation gas/reformed gas will flow more freely inside the reformer, if the reformer according to claim 1 or 2 is used together with a heat exchanger to heat oxidizer using heat of reformed gas discharged from the reformed gas outlet in the reformer; and an oxidizer pass to supply oxidizer heated by the heat exchanger into the reformer through the oxidizer inlet.

Therefore, it can be said that the reformer of the present invention is one that is preferable to use as a component of a reformer system with such configuration.

Advantageous Effects of Invention

According to the present invention, it is possible to provide the gasification furnace and gasification system which can gasify biomass resources with little production of tar and/or clinker, and it is also possible to provide the gasification system which does not require electrical energy etc. for reforming dry distillation gas.

DESCRIPTION OF EMBODIMENTS

An embodiment of the present invention will hereinafter be described in depth with reference to the drawings.

Figure 1:
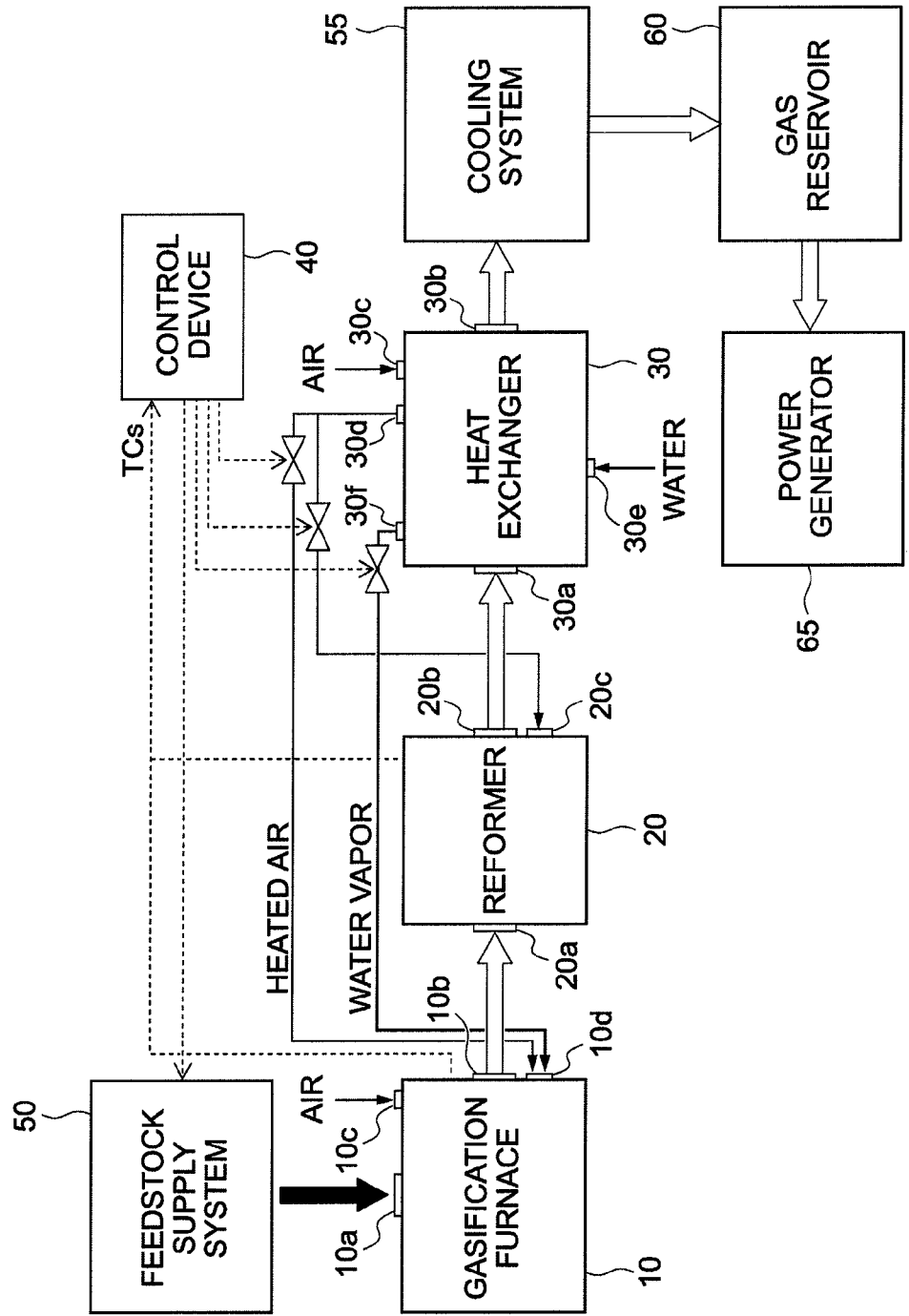
FIG. 1 is an explanatory diagram of gasification system according to one embodiment of the present invention.

To start with, outlines of a gasification system and a reforming system according to one embodiment of the present invention will be described with reference to FIG. 1.

The gasification system according to the present embodiment is so-called a biomass power generator system. As shown in Figure, the gasification system includes a gasification furnace 10, a reformer 20, a heat exchanger 30, a control device 40, a feedstock supply system 50, a cooling system 55, a gas reservoir 60 and a power generator 65. Further, the gasification system contains the reforming system according to the present embodiment, which consists of the reformer 20, the heat exchanger 30, and a heated air path connecting heated air supply port 20c of the reformer 20 and air inlet 30c of the heat exchanger 30.

The Feedstock supply system 50 is a system that consists of a crusher which crushes woody/herbaceous biomass which is transported by trucks, a main hopper which holds woody/herbaceous biomass (hereafter called feedstock) which is crushed by the crusher, a supply mechanism for supplying feedstock within the main hopper to the gasification furnace 10, and so on. Main components of the supply mechanism of this feedstock supply system 50 are chain conveyers, bucket elevators and screw conveyers which can be controlled by the control device 40.

The gasification furnace 10 is a unit that gasifies feedstock supplied from the feedstock supply system. This gasification furnace 10 includes a feedstock supply port 10a from which feedstock is supplied into the furnace (into the furnace shell), and a dry distillation gas outlet 10a from which dry distillation gas generated from feedstock is discharged. The gasification furnace 10 also includes a first oxidizer supply port 10c from which air (unheated air in this embodiment) is supplied to the furnace, and a second oxidizer supply port 10b from which heated air and water vapor are supplied into the furnace.

The reformer 20 is a unit that reforms dry distillation gas discharged from the dry distillation gas outlet 10b of the gasification furnace 10. The reformer 20 includes a dry distillation gas inlet 20a connected to the dry distillation gas outlet 10b of the gasification furnace 10, and a reformed gas outlet 20b that is an outlet of reformed gas (reformed dry distillation gas). The reformer 20 also includes a heated air supply port 20c that is an inlet of heated air for reforming (combusting partially) dry distillation gas.

The heat exchanger 30 is a unit that generates heated air and water vapor using the heat of dry distillation gas from the reformer 20. The heat exchanger 30 includes a reformed gas inlet 30a connected to the reformed gas outlet 20b of the reformer 20, a reformed gas outlet 30b for discharging reformed gas outside of reformer 20, an air inlet 30c, a heated air outlet 30d, a water inlet 30e, and a water vapor outlet 30f.

As shown in the Figure, the heated air outlet 30d of the heat exchanger 30 is connected to each of the second oxidizer supply port 10d of the gasification furnace 10 and the heated air inlet 20c of the reformer 20 by pipes having flow control valves. The water vapor outlet 30f is connected to the second oxidizer supply port 10d of the gasification furnace 10 by pipes having flow control valves.

The water inlet 30e of the heat exchanger 30 is connected to a water tank (not shown) through a pipe (not shown) with a pump. The air inlet 30c of the heat exchanger 30 is connected to a blower (a fan; not shown) through a pipe.

The control device 40 is a device (a so-called sequencer in this embodiment) that controls the supply mechanism of the feedstock supply system 50, each of the flow control valves of this system, based on output (TCs in FIG. 1) of temperature sensors 42 (see FIGS. 2 and 4), which are installed at various places in the system, so that feedstock gasification and dry distillation gas reforming will operate properly.

The cooling system 55 is a system that cools reformed gas discharged from the reformed gas outlet 30b of the heat exchanger 30. The gas reservoir 60 is a vessel that stores reformed gas cooled by the cooling system 55, and the generator 65 is a unit (a so-called gas engine generator) that generates power based on reformed gas in the gas reservoir 60.

Based on the premise of what has been described so far, the configuration of the gasification system according to the present embodiment will be specifically explained. Note that, among components of the gasification system of this embodiment, the feedstock supply system 50, the cooling system 55, the gas reservoir 60 and the power generator 65 are also used in gasification system (biomass generator systems) already in existence. For this reason, explanation only to the configurations of other components of the gasification system according to this embodiment will be given below.

First, the configuration of the gasification furnace 10 will be described with reference to FIGS. 2 and 3. Note that, FIG. 3 is a cross-section view of arrow A-A in FIG. 2. In these Figures and each of the Figures which will be used below, scale of measurement, number and location of each part have been modified arbitrarily to make each part of the gasification furnace 10 easy to recognize.

Figure 2:
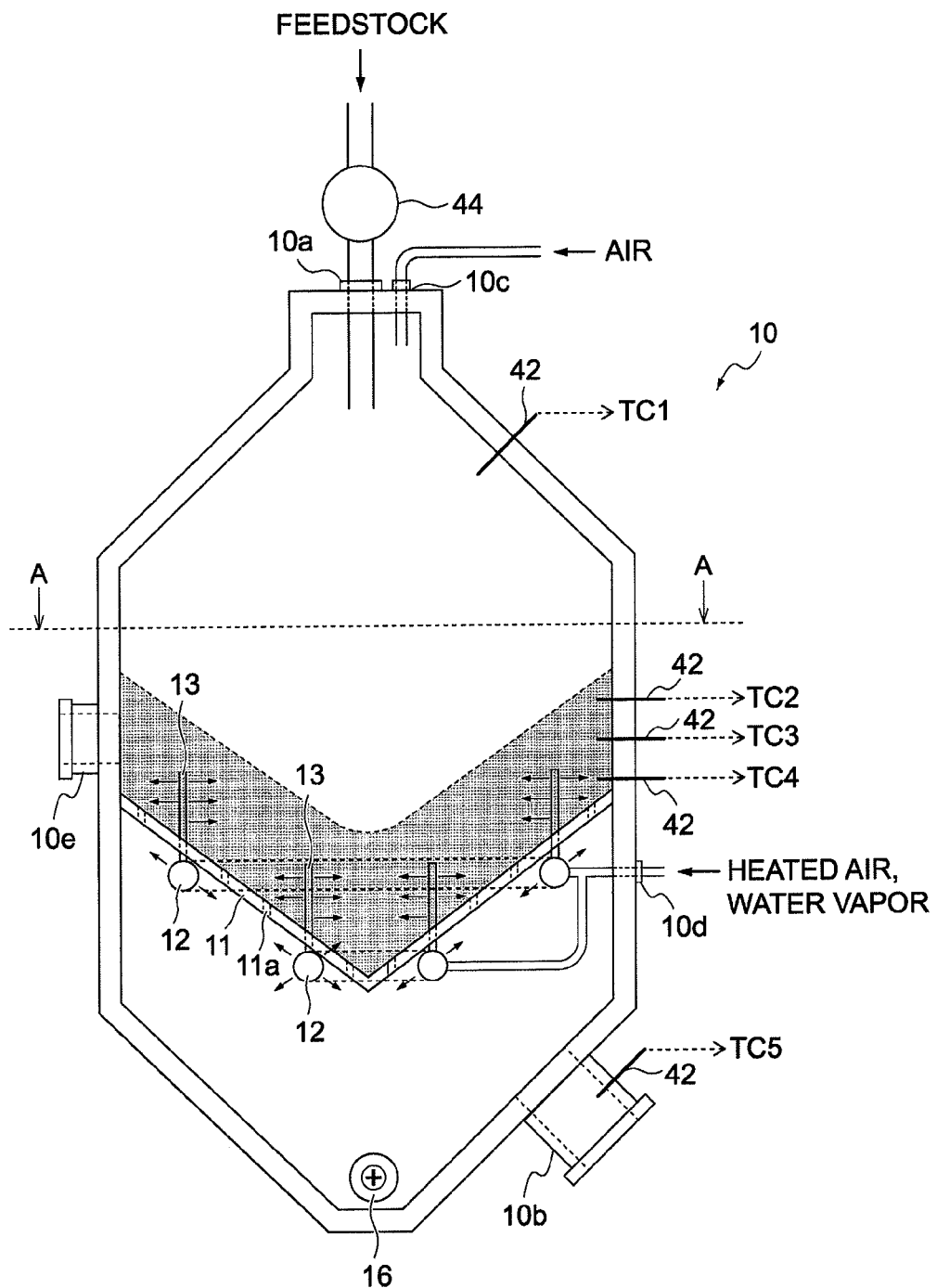
FIG. 2 is a diagram of gasification furnace of a gasification system according to the embodiment.
Figure 3:
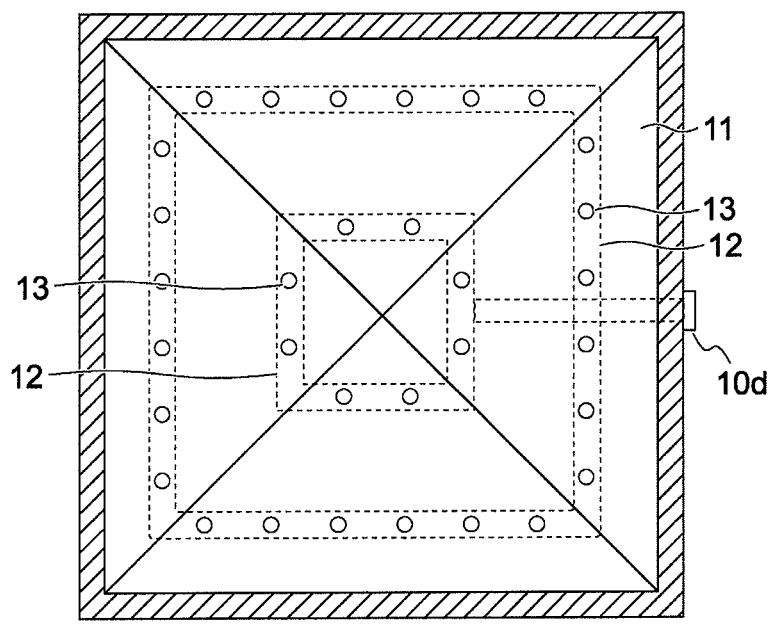
FIG. 3 is a cross-sectional view of arrow A-A in FIG. 2.

As obvious from FIGS. 2 and 3, the gasification furnace 10 is a unit with a shape like a regular rectangular prism tapered off at the top and the bottom. Further, the gasification furnace 10 (FIG. 2) is a unit wherein the above mentioned feedstock supply port 10a and first oxidizer supply port 10c are fixed on its upper part (top surface), and the above mentioned dry distillation gas outlet 10b and second oxidizer supply port 10d are fixed on its lower part (bottom surface).

In the gasification furnace 10, a punching plate 11 having a plurality of through holes (8 mm diameter holes in this embodiment) is set so as to separate the inner part of the furnace into upper and lower spaces. This punching plate is shaped like side faces of a square pyramid (4 faces of a square pyramid except the Bottom). The punching plate 11 also has a plurality of through holes (see FIG. 3) to which perforated pipes 13 (details of which will be described later on) are inserted.

In the gasification furnace 10, set is a second oxidizer supply path that includes, as main components, a large and a small circular pipes 12, the plurality of perforated pipes 13 in communication with each circular pipe 12, and connecting pipes which connect each circular pipe 12 to the second oxidizer supply port 10d.

Each perforated pipe 13 configuring the second oxidizer supply path is a pipe-shaped member whose side surface (pipe wall) has a plurality of through holes and whose one end (upper edge of FIG. 2) is sealed. As each perforated pipe 13, a pipe whose length is determined based on the thickness D of the feedstock on the punching plate 11 during continuous operation of the system (in this embodiment, a pipe whose part above the punching plate 11 has a length of approximately 0.6×D).

Each circular pipe 12 is a member manufactured by processing a pipe with a plurality of through holes on side surface into a square shape and connecting both ends of the processed pipe. Each circular pipe 12 has a plurality of through holes for installing perforated pipe 13 as illustrated in FIG. 2 and through holes for installing connecting pipes mentioned above. And, the second oxidizer supply path consists of combination of parts of such shapes, that is for distributing and supplying oxidizer (heated air and water vapor in this embodiment) which is supplied to the second oxidizer inlet 10d to a plurality of places in predetermined area near the punching plate 11.

The gasification furnace 10 is connected to a rotary feeder 44 in order to throw feedstock from the feedstock supply system 50 into the feedstock supply port 10a (to throw feedstock into gasification furnace 10 with pressure difference). Further, the gasification furnace 10 includes pipe for introducing oxidizer into the furnace (unheated air in this embodiment) which is supplied to the first oxidizer inlet 10c. In addition, the gasification furnace 10 includes a member (not shown) for evenly distributing air from the pipe and feedstock from the feedstock supply port 10a to each place on the punching plate 11 and each place of the feedstock on the punching plate 11.

The gasification furnace 10 includes an ignition port 10e on a specific side wall (on left side wall in FIG. 2). The gasification furnace 10 is also equipped with an ignition mechanism (not shown) which is controlled by control device 40, which introduces igniting agent (solid methanol), through this ignition port 10e, onto the feedstock which is on the punching plate 11.

The gasification furnace 10 has an ash removal screw 16 on the bottom for removing ash generated by gasification of feedstock out of the furnace. The gasification furnace is also equipped with a plurality of temperature sensors that measure temperatures of each area inside the furnace.

The gasification furnace 10 according to the present embodiment has configuration as explained, and is coated with flocculent heat-resistant material (ceramic blanket) to minimize losing heat inside the furnace.

Figure 4:
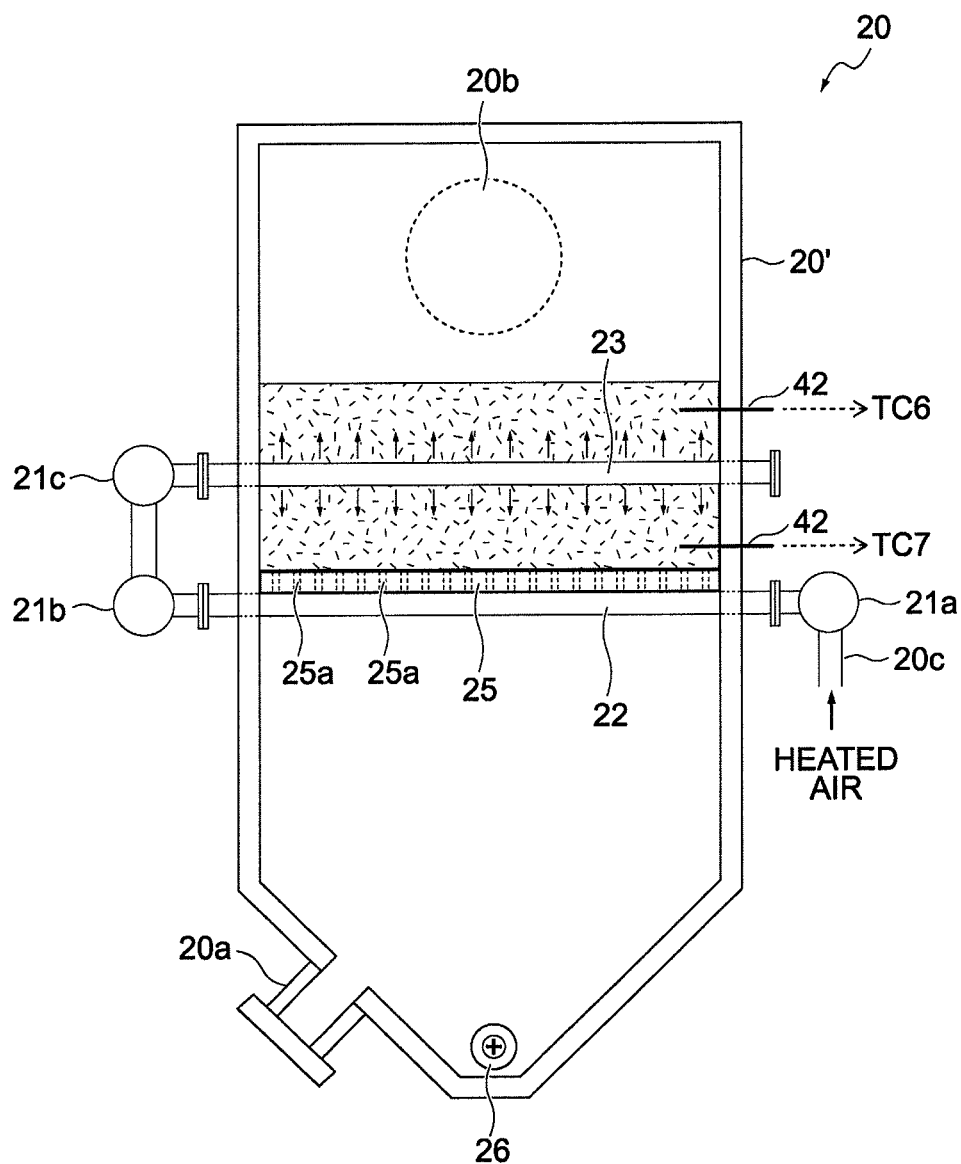
FIG. 4 is a diagram of reformer in gasification system according to the embodiment.
Figure 5:
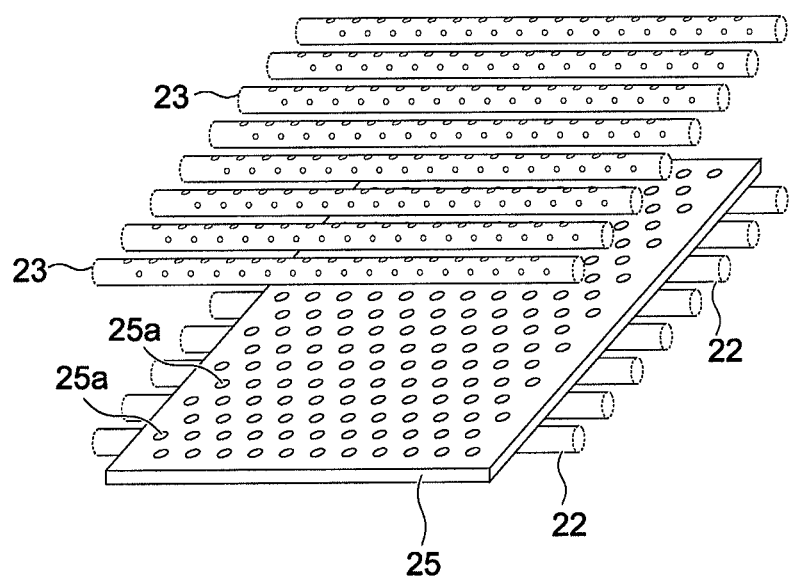
FIG. 5 is an explanation of internal configuration of a reformer.

Next, a description is given of the configuration of the reformer 20 using FIGS. 4 and 5.

The reformer 20 (FIG. 4) is a unit that consists of the reformer vessel 20', a plurality of heat receiving pipes 22, a plurality of hot air exhaust pipes 23, etc.

The reformer vessel 20' is a vessel in a shape like a hollow rectangular parallelepiped having tapered off lower edge. As shown in FIG. 4, this reformer vessel 20' is a unit wherein the dry distillation gas inlet 20a is provided near the bottom, and the reformed gas outlet 20b is provided at a position higher than the reformed gas inlet 20a.

The heat receiving pipes 22 are pipes each of which is installed so as to pass through the reformer vessel 20'. The heat receiving pipes 22 are also installed so that their upper parts forms a plane nearly level to the mounting surface of the reformer 20.

One opening of each heat receiving pipe 22 is connected to a header 21a which includes a heated air inlet 20c, and the other opening of each heat receiving pipe 22 is connected to a header 21b.

Each hot air exhaust pipe 23 is a pipe installed, inside reformer vessel 20', higher than each heat receiving pipe 22 and lower than bottom end of reformed gas outlet 20b, running through reformer vessel 20'. Each hot air exhaust pipes 23 (see FIG. 5) inside reformer vessel 20' form through holes in various places.

One opening of each hot air exhaust pipe 23 is sealed with a pipe end closure flange, and the other opening of each hot air exhaust pipe 23 is connected to the header 21b via a header 21c.

The punching plate 24 (see FIG. 5) with a plurality of through holes 25a are installed on the plurality of the heat receiving pipes 22 inside reformer vessel 20'. In space above the punching plate 25 in the reformer vessel 20' is filled with enough heat storage material to bury each hot air exhaust pipe 23. This heat storage material is for uniformizing the temperature distribution within the reformer vessel 20' and removing impurities in the reformed gas (and also dry distillation gas during reforming). Therefore, heat storage material with high specific heat, high heat resistance, which are highly resistant to acidic gases such as acetic acid, tar and $H_2S$, are desired. Because heat storage material which is not of cement, and which has less pressure loss are desirable, hollow cylindrical ceramic components, etc. are used.

The reformer vessel 20' is equipped, at the bottom, with an ash removal screw 26 to remove ash generated by gasification of feedstock out of the furnace. Moreover, the reformer vessel 20' is also equipped with two temperature sensors to measure temperatures of section where heat storage material is filled in the reformer 20 (the reformer vessel 20').

Next, the configuration of the heat exchanger 30 will be described.

Figure 6:
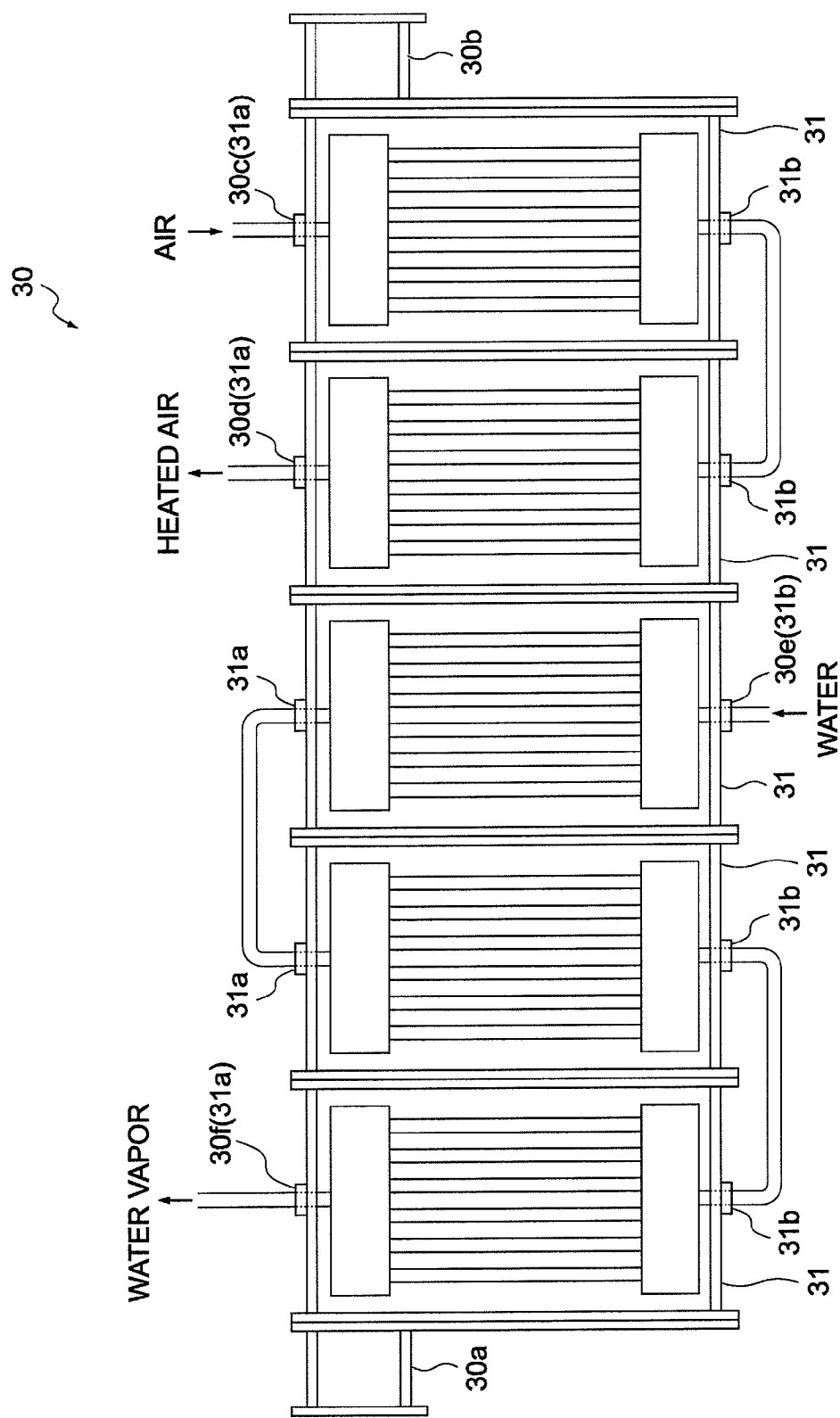
FIG. 6 is a diagram of heat exchanger which is equipped in gasification system according to the embodiment.

As shown in FIG. 6, the heat exchanger 30 is a unit that is made by connecting five numbers of the unit heat exchangers each of which has an inlet and an outlet for heat object and an inlet 31x (x=a or b) and an outlet 31y (y=b or a) for heat source gas, so that reformed gas which discharged from reformer 20 passes through each of the unit heat exchanger one after another. Further, the heat exchanger 30 is also a unit that is made by connecting the outlets 31y for heated object of some unit heat exchangers 31 to the inlets 31x for heated objects of other unit heat exchangers so that two unit heat exchangers 31 in the back function as "means for generating heated air, having the air inlet 30c and the heated air outlet 30d", and three unit heat exchangers 31 in the front function as "means for generating water vapor, having the water inlet 30e and the water vapor outlet 30f".

In advance of a detailed discussion on functions of control device 40, the reason why the gasification furnace 10, the reformer 20 and the heat exchanger 30 of above configuration are used in the gasification system of the present embodiment.

The configuration of the above gasification furnace 10 is thought of based on the knowledge obtained by every type of experiment that "by supplying relatively high temperature oxidizer on lower layer of feedstock on the punching plate and supplying unheated oxidizer (air, for example) to the feedstock from top, it is possible to gasify feedstock (biomass resources) with minimal production of tar and clinker." Even though the reason why using the above configuration can gasify feedstock with minimal production of tar and such has not been determined, the fact that this configuration makes it easier for gas to pass through gasifying feedstock, and the fact that this configuration makes it easier to control temperature by controlling the amount of oxidizer it supplies, better than gasification furnace with only 1 oxidizer supply port, may be the causes.

However, if the oxidizer which is supplied to gasification furnace 10 is heated by electric heater, electric energy output amount of the gasification system would be short of the amount of electric energy necessary to heat oxidizer. Also when using electric heater for reforming dry distillation gas discharged from gasification furnace 10, electric energy output of the gasification system would be also short of the amount of electric energy necessary for reforming (heating) reformed gas.

Meanwhile, when heating of oxidizer and reforming of dry distillation gas is performed using heat of dry distillation gas discharged from the gasification furnace 10, it is possible to achieve a gasification system without such problems as mentioned above. For this purpose, the gasification system according to the present embodiment employs the heat exchanger 30 (FIG. 6) to generate water vapor and heated air which are supplied to the gasification furnace 10, by using heat generated by dry distillation gas in the heat exchanger 30. Further, the gasification system of the embodiment employs the heat exchanger 30 (FIG. 4) which reforms dry distillation gas from the gasification furnace 10 using heated air generated by the heat exchanger 30, more specifically, the reformer 20 which heats heated air generated by the heat exchanger 30 using dry distillation gas from the gasification furnace 10, and then reforms dry distillation gas from the gasification furnace 10 using re-heated air.

Next, the control mechanism by control device 40 for gasification system will be explained.

When continuous operation (steady operation) of the gasification system is performed, the control device 40 controls the supply mechanism in the feedstock supply system 50 so that feedstock can be supplied into the gasification furnace 10 at a predetermined speed. Further, the control device also controls each flow control valve in the system so that each temperature (mainly TC1-TC7 in FIGS. 2 and 4) in the system is within a predetermined temperature range.

The process (hereinafter called the flow control valve process for continuous operation) that the control device 40 performs is a process of controlling each flow control valve in the system so that the temperature TC5 can remain within 850° C.-900° C., and the temperature TC6 remains within 1050° C.-1100° C.

More specifically, the flow control valve process for continuous operation is a process of controlling each flow control valve so that heated air can be supplied from the second oxidizer supply port 10d at the air ratio of 0.3-0.4, and more air can be supplied than heated air from the first oxidizer supply port 10d. And heated air (in other words, heated air generated by heat exchanger 30 that is supplied with reformed gas of 1050° C.-1100° C.) is at 400° C.-550° C.

The flow control valve process for continuous operation is also, as a general rule, to adjust TC5 by controlling the amount of air supply from the first oxidizer supply port 10d.

When making the gasification system start to gasify feedstock, the control device 40, at first, controls the supply mechanism in the feedstock supply system 50 so that a specific amount of feedstock is supplied to the gasification furnace 10. Next, the control device 40 introduces approximately 100 g of solid methanol into the gasification furnace 10, by controlling ignition mechanism installed at the ignition port 10e of the gasification furnace 10. The control device 40 also controls a blower connected to the first oxidizer supply port 10c so that air is supplied to the gasification furnace 10 from the first oxidizer supply port 10c.

Thereafter, the control device 40 starts a process of monitoring temperature (TC1 in FIG. 2) detected by temperature sensor 42 which is installed at the highest part of the gasification furnace 10 so to achieve a first specific temperature which is predetermined as a temperature when combustion (partial combustion) of feedstock in the gasification furnace 10 progresses to a certain extent.

When it is detected that TC1 reached the first specific temperature, the control device 40 controls each flow control valve for heated air and water vapor so that heated air from heat air outlet 30d and water vapor from water vapor outlet 30f of the heat exchanger 30 are supplied to the second oxidizer supply port 10d.

Then, the control device 40 starts to monitor temperature TC5 of dry distillation gas discharged from the gasification furnace 10 to achieve a predetermined second specific temperature, and when TC5 reaches the second specific temperature, it increases the amount of air supplied to the gasification furnace 10 from the first oxidizer supply port 10c.

Note that, the status where TC5 reaches the second specific temperature is a status where pyrolysis zone is not formed (status where lower part of the feedstock on the punching plate 11 is oxidative decomposition zone, and upper part is dry heat zone) in the feedstock on the punching plate 11.

Thereafter, the control device 40 starts monitoring temperatures TC1-TC5 at each place in the gasification furnace 10, so temperature in the feedstock indicates pyrolysis zone is formed on the punching plate 11. Then, when temperatures TC1-TC5 reach such temperature, the control system 40 starts continuous operation control process (includes the flow control valve process for continuous operation already explained) so that continual gasification of feedstock is performed by supplying feedstock at a specific temperature.

<<Variations>>

The above gasification system according to the embodiment, can have variations of every type. For example, the gasification furnace 10 can be modified into a furnace that has the punching plate 11 having a tabular shape. However, various experiments proved that when the thickness of the feedstock (biomass resources) on the punching plate 11 is uneven (part of biomass resources on the punching plate is thicker than others), it is less likely to misfire. Therefore, for the punching plate 11, it is desirable to use a non-tabular component such as the punching plate 11 described above.

Further, the gasification furnace 10 can be modified to be equipped with cylindrical gasification furnace. However, square prism shape gasification furnace can introduce more feedstock inside, therefore, the shape described above is desirable for gasification furnace 10.

Although it won't be able to utilize heat energy of dry distillation gas generated by the gasification furnace 10, the gasification system can be modified into a system in which a reformer which requires electrical energy in order to operate is use instead of the reformer 20, or into a system which uses electrical energy to heat oxidizer supplied to the gasification furnace 10. The gasification system can also be modified into a system for producing methanol, etc.

Figure 7:
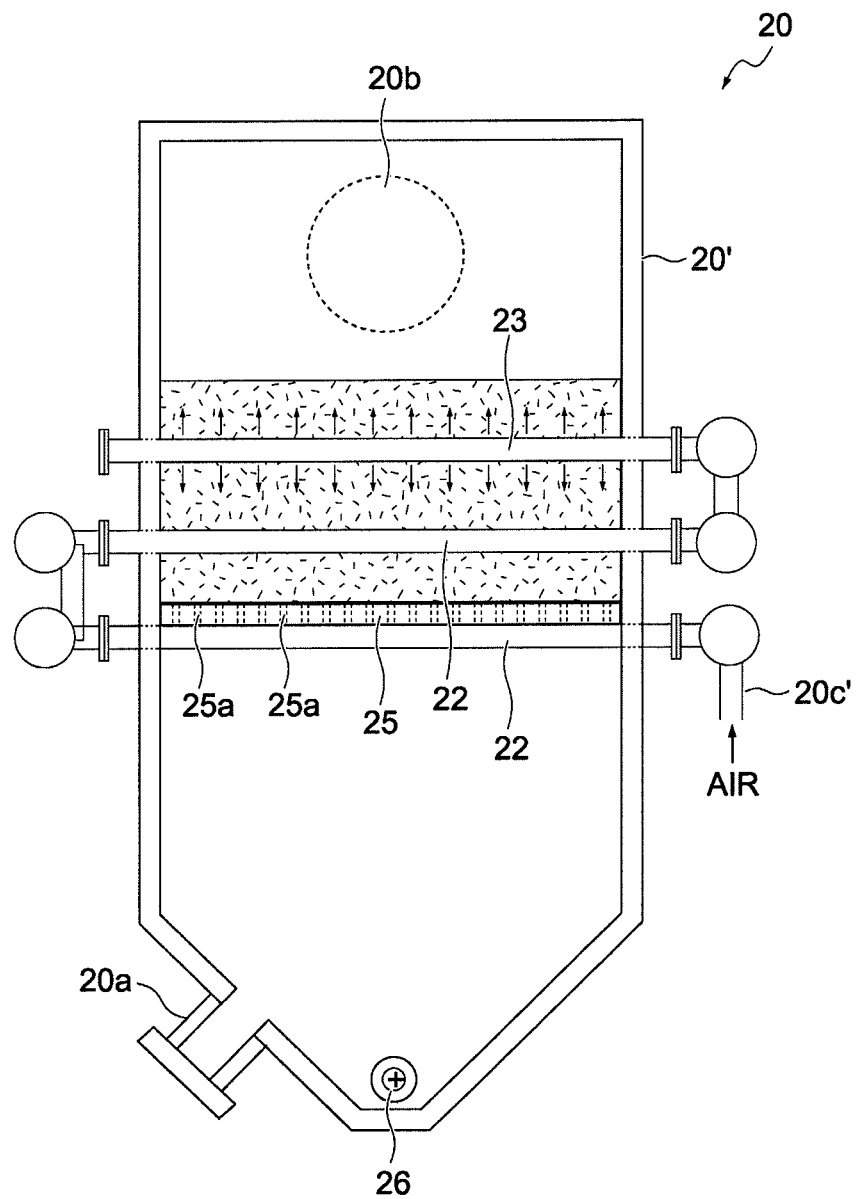
FIG. 7 is an explanatory diagram of a modified example of the reformer according to the embodiment.

The reforming system (the system which consists of the reformer 20, the heat exchanger 30, and the heated air path connecting them) according to the embodiment described above can have variations of every type. For example, the reformer 20 can be modified into a unit to which air of normal temperature can be supplied. Note that, such modification of the reforming system 20 can be achieved, for example, as illustrated in FIG. 7, by introducing air supplied through the air supply port 20c from the hot air exhaust pipe 23 into the reformer vessel 20' after passing through a plurality of (2 in the figure) the heat receiving pipes 22 which runs across reformer vessel 20'.

Moreover, the reformer 20 can be modified into a unit that doses not to have heat storing material (a unit having the same configuration as that of a common heat exchanger). However, having heat storing material built in equalizes each temperature within the reformer vessel 20', and also prevents through holes of hot air exhaust pipe 23 from getting clogged with impurities in reformed gas. Therefore, the reformer 20 can vary from configuration described above in detail, but having heat storing material built in is preferable.

It is also understandable that reforming system can be paired with downdraft/updraft type gasification furnace, and the reforming system can be used in the gasification system for producing methanol, etc.

The invention claimed is:

1. A reformer for reforming dry distillation gas, the reformer comprising:
   a reformer vessel;
   a dry gas inlet for introducing dry distillation gas into the reformer vessel, a reformed gas outlet for discharging reformed gas defined as the dry distillation gas after being reformed, an oxidizer inlet configured to introduce only oxidizer into the reformer vessel separate from the dry gas inlet, each of which are provided on the reformer vessel;
   a plurality of heat receiving pipes, wherein each of the plurality of heat receiving pipes passes through the reformer vessel and communicates with the oxidizer inlet at one end;
   a plurality of hot air exhaust pipes each having a portion that is kept in a space of the reformer vessel, the portion having a plurality of through holes in its pipe wall; and
   at least one connecting conduit, provided outside of the reformer vessel, the connecting conduit connecting the plurality of the hot air exhaust pipes and the plurality of the heat receiving pipes such that the connecting conduit is configured to allow the oxidizer introduced from the oxidizer inlet into the plurality of the heat receiving pipes to be discharged from each through hole of each hot air exhaust pipe.

2. The reformer according to claim 1 further comprising:
   a punching plate which is installed on parts of the plurality of the heat receiving pipes, the parts being in the reformer vessel; and
   heat storage material placed on the punching plate.

3. A reformer system, comprising:
   a reformer according to claim 1;
   a heat exchanger to heat oxidizer using heat of reformed gas discharged from the reformed gas outlet in the reformer; and
   an oxidizer pass to supply oxidizer heated by the heat exchanger into the reformer through the oxidizer inlet.

* * * * *

UNITED STATES PATENT AND TRADEMARK OFFICE
CERTIFICATE OF CORRECTION

| | | |
|---|---|---|
| PATENT NO. | : 10,195,582 B2 | Page 1 of 1 |
| APPLICATION NO. | : 15/069232 | |
| DATED | : February 5, 2019 | |
| INVENTOR(S) | : Yasuharu Matsushita | |

It is certified that error appears in the above-identified patent and that said Letters Patent is hereby corrected as shown below:

On the Title Page

Item (73) Assignees: "Yashuharu Matsushita, Tokyo (JP)" should read --Yasuharu Matsushita, Toyama (JP)--.

Signed and Sealed this
Thirteenth Day of August, 2019

Andrei Iancu
*Director of the United States Patent and Trademark Office*